United States Patent
Woo

(10) Patent No.: US 10,192,357 B2
(45) Date of Patent: Jan. 29, 2019

(54) GRAPHIC PROCESSING APPARATUS AND METHOD OF PERFORMING GRAPHICS PIPELINE

(71) Applicant: Samsung Electronics Co., Ltd., Suwon-si (KR)

(72) Inventor: Sangoak Woo, Anyang-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 210 days.

(21) Appl. No.: 15/202,608

(22) Filed: Jul. 6, 2016

(65) Prior Publication Data

US 2017/0140573 A1    May 18, 2017

(30) Foreign Application Priority Data

Nov. 18, 2015 (KR) .......................... 10-2015-0161918

(51) Int. Cl.
| | |
|---|---|
| *G06T 17/20* | (2006.01) |
| *G06T 1/20* | (2006.01) |
| *G06T 1/60* | (2006.01) |
| *G06T 11/40* | (2006.01) |
| *G06T 15/00* | (2011.01) |

(52) U.S. Cl.
CPC ................ *G06T 17/20* (2013.01); *G06T 1/20* (2013.01); *G06T 1/60* (2013.01); *G06T 11/40* (2013.01); *G06T 15/005* (2013.01); *G06T 2200/28* (2013.01); *G06T 2210/12* (2013.01)

(58) Field of Classification Search
None
See application file for complete search history.

(56) References Cited

U.S. PATENT DOCUMENTS

| | | |
|---|---|---|
| 8,704,826 B1 | 4/2014 | Hakura et al. |
| 2011/0267346 A1 | 11/2011 | Howson |
| 2013/0120380 A1 | 5/2013 | Kallio et al. |
| 2013/0265309 A1* | 10/2013 | Goel ................. G06T 15/80 345/426 |
| 2014/0176544 A1 | 6/2014 | Fishwick et al. |
| 2014/0267259 A1 | 9/2014 | Frascati et al. |
| 2014/0324204 A1* | 10/2014 | Vidimce ............ B29C 67/0088 700/98 |
| 2015/0042650 A1 | 2/2015 | Kim et al. |

FOREIGN PATENT DOCUMENTS

| | | |
|---|---|---|
| KR | 10-2015-0018953 A | 2/2015 |
| WO | WO 2009/093956 A1 | 7/2009 |

OTHER PUBLICATIONS

European Search Report dated Mar. 3, 2017 in copending European Application No. 16197336.7.

* cited by examiner

*Primary Examiner* — Zhengxi Liu
(74) *Attorney, Agent, or Firm* — F. Chau & Associates, LLC

(57) ABSTRACT

A graphic processing apparatus and a method of performing a graphics pipeline in the graphic processing apparatus are provided. The method of performing a graphics pipeline in a graphic processing apparatus includes binning to generate a bounding box bitstream corresponding to a drawcall requiring tessellation, and in response to a bounding box allocated by the bounding box bitstream being identified in a current tile to be processed, rendering the current tile by performing selective tessellation on drawcalls corresponding to the identified bounding box.

13 Claims, 17 Drawing Sheets

FIG. 13
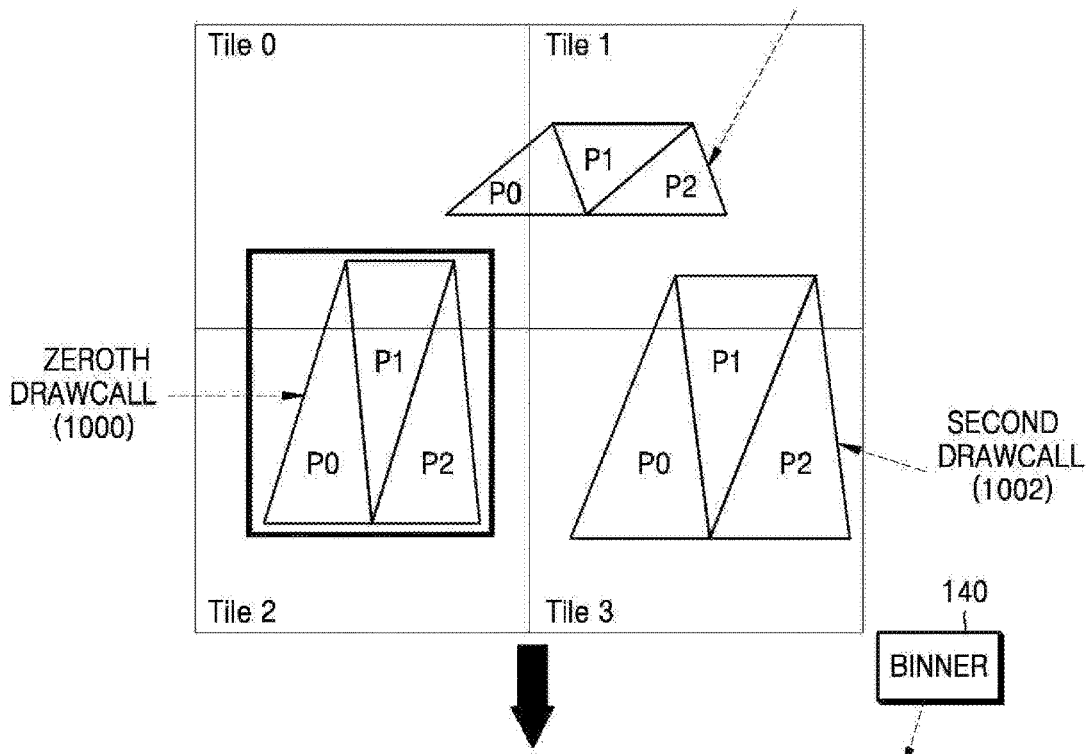
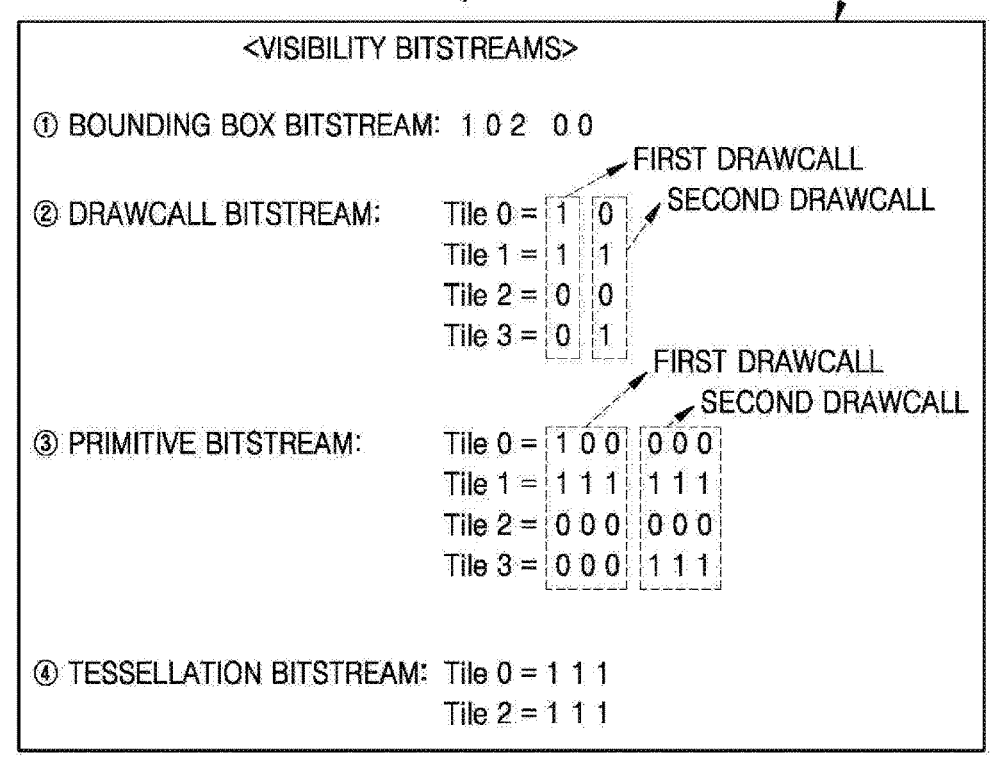

GRAPHIC PROCESSING APPARATUS AND METHOD OF PERFORMING GRAPHICS PIPELINE

CROSS-REFERENCE TO RELATED APPLICATION

This application claims the benefit under 35 USC § 119(a) of Korean Patent Application No. 10-2015-0161918, filed on Nov. 18, 2015, in the Korean Intellectual Property Office, the entire disclosure of which is incorporated herein by reference for all purposes.

BACKGROUND

1. Field

The following description relates to a graphic processing apparatus and a method of performing a graphics pipeline.

2. Description of Related Art

A graphic processing apparatus, such as, for example, a graphic processing unit (GPU), renders graphics data in computing apparatuses, such as, for example, workstations, personal computers (PCs), notebook computers, video game consoles, and embedded devices. Some examples of embedded devices are smart phones, tablet devices, and wearable devices. The graphic processing apparatus generates a frame for display by converting graphics data corresponding to two-dimensional (2D) or three-dimensional (3D) objects into 2D pixel representations. While embedded devices have a relatively low processing power and a high power consumption, workstations, PCs, notebook computers, and video game consoles ensure a sufficient memory space and processing power. Thus, the embedded devices are not properly equipped with graphic processing performance comparable to the workstations. As embedded devices have become more widely used, users are playing games through the smart phones or the tablet devices, or are watching content, such as, for example, movies, soap operas more frequently than before. Accordingly, manufacturers of graphic processing apparatuses have conducted research to improve the performance and processing efficiency of the graphic processing apparatuses even in embedded devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided a method of performing a graphics pipeline in a graphic processing apparatus, the method including binning to generate a bounding box bitstream corresponding to a drawcall requiring tessellation, and in response to a bounding box allocated by the bounding box bitstream being identified in a current tile to be processed, rendering the current tile by performing selective tessellation on drawcalls corresponding to the identified bounding box.

The bounding box bitstream may include information indicating whether tessellation is to be performed for each input drawcall and information about a tile list covering the bounding box corresponding to the drawcall requiring the tessellation.

The binning may include generating, by a binning pipeline, a drawcall bitstream including information indicating visibility of each input drawcall and a primitive bitstream including information indicating visibility of a primitive included in the input drawcall.

The method may include determining, by a binning pipeline, whether each input drawcall is a first-type drawcall requiring the tessellation or a second-type drawcall requiring no tessellation, performing, by the binning pipeline, tile binning to identify a tile list covering the bounding box corresponding to the first-type drawcall, and generating, by the binning pipeline, the bounding box bitstream including identification information indicating the first-type drawcall, identification information indicating the second-type drawcall, and information about the tile list.

The tessellation may be deferred to be performed in a rendering pipeline.

The rendering of the current tile, at a rendering pipeline, may include rendering the current tile in different rendering schemes for a first-type drawcall requiring the tessellation and for a second-type drawcall requiring no tessellation using the bounding box bitstream.

The first-type drawcall may be processed by a first sub rendering pipeline including a tessellation stage, and the second-type drawcall may be processed by a second sub rendering pipeline not including the tessellation stage.

The first sub rendering pipeline may perform the tessellation on the first-type drawcall to be processed in the current tile, in response to determining that the tessellation for the first-type drawcall has not been performed in a previous tile, and the first sub rendering pipeline may skip the tessellation for the first-type drawcall to be processed in the current tile, in response to determining that tessellated primitives for the first-type drawcall have been generated in the previous tile.

The method may include scheduling, by a rendering pipeline, a rendering order of tiles based on a result of tile binning of the bounding box bitstream, such that a higher priority is assigned to a tile covering a bounding box, and performing, by the rendering pipeline, rendering on a per-tile basis according to the scheduled rendering order.

The method may include deleting data associated with tessellated primitives from a memory, in response to the tessellated primitives for a first-type drawcall are not used in other tiles.

In another general aspect there is provided a computing apparatus for performing a graphics pipeline, the computing apparatus including a graphic processing unit (GPU) configured to perform a binning pipeline to generate a bounding box bitstream corresponding to a drawcall requiring tessellation, and in response to a bounding box allocated by the bounding box bitstream being identified in a current tile to be processed, perform a rendering pipeline to render the current tile by performing selective tessellation on drawcalls corresponding to the identified bounding box, and a memory configured to store the bounding box bitstream generated in the binning pipeline and to provide the stored bounding box bitstream to the rendering pipeline.

The bounding box bitstream may include information indicating whether tessellation is to be performed for each input drawcall and information about a tile list covering the bounding box corresponding to the drawcall requiring the tessellation.

While the binning pipeline is performed, the GPU may be configured to generate a drawcall bitstream including information indicating visibility of each input drawcall and a primitive bitstream including information indicating visibility of a primitive included in the input drawcall.

While the binning pipeline is performed, the GPU may be configured to determine whether each input drawcall is a first-type drawcall requiring the tessellation or a second-type drawcall requiring no tessellation, perform tile binning to identify a tile list covering the bounding box corresponding to the first-type drawcall, and generate the bounding box bitstream including identification information indicating the first-type drawcall, identification information indicating the second-type drawcall, and information about the tile list.

The GPU may be configured to perform the graphics pipeline based on deferred tessellation.

While the rendering pipeline is performed, the GPU may be further configured to render the current tile in different rendering schemes for a first-type drawcall requiring the tessellation and for a second-type drawcall requiring no tessellation using the bounding box bitstream.

The first-type drawcall may be processed by a first sub rendering pipeline including a tessellation stage, and the second-type drawcall may be processed by a second sub rendering pipeline not including the tessellation stage.

While the rendering pipeline is performed, the GPU may be configured to schedule a rendering order of tiles based on a result of tile binning, which is included in the bounding box bitstream, such that a higher priority is assigned to a tile covering a bounding box, and perform rendering on a per-tile basis according to the scheduled rendering order.

The memory may be configured to deletes data associated with tessellated primitives while the rendering pipeline is performed, in response to the tessellated primitives for a first-type drawcall are not used in other tiles.

Other features and aspects will be apparent from the following detailed description, the drawings, and the claims.

BRIEF DESCRIPTION OF THE DRAWINGS

FIG. 13 is a diagram illustrating an example for describing various types of visibility bitstreams.

Figure 1:
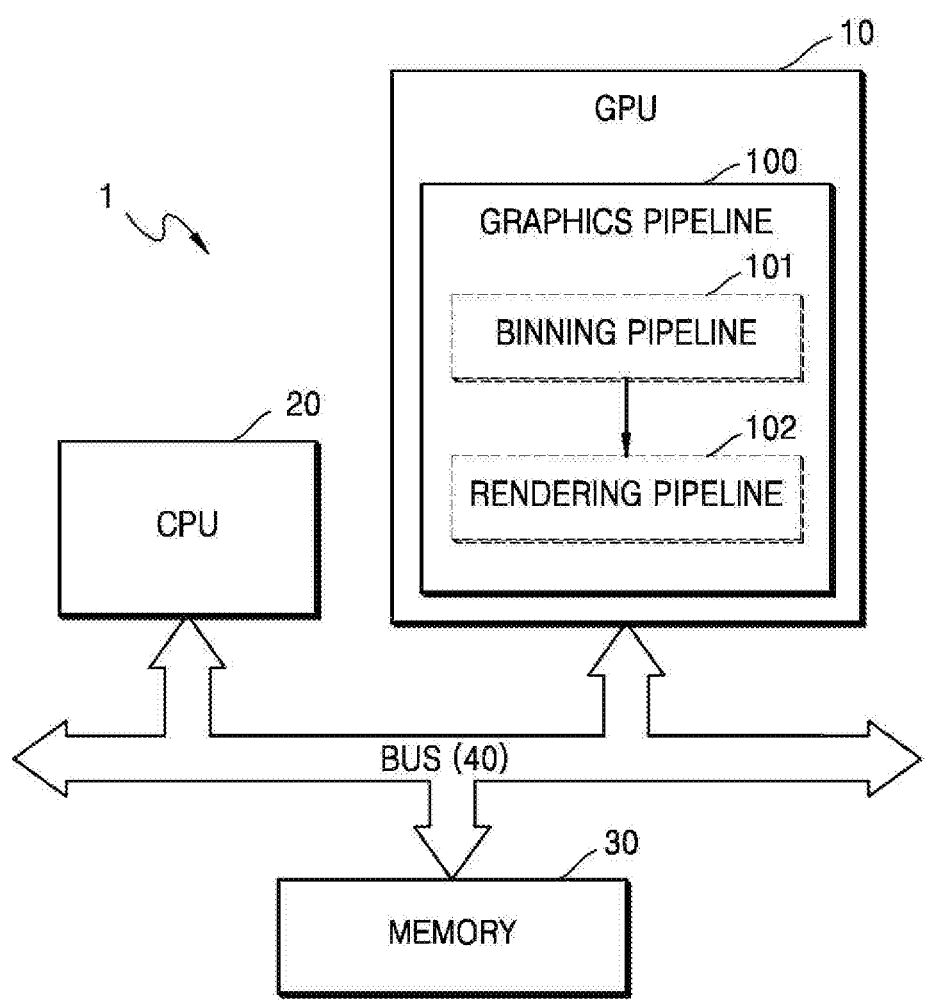
FIG. 1 is a diagram illustrating an example of a computing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that may be well known to one of ordinary skill in the art, after an understanding of the present disclosure, may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various alterations and modifications may be made to the described embodiments, some of which will be illustrated in detail in the drawings and detailed description. However, it should be understood that these embodiments are not construed as limited to the illustrated forms and include all changes, equivalents, or alternatives within the idea and the technical scope of this disclosure.

Terms used herein are to merely explain specific embodiments, and thus are not meant to be limiting. A singular expression includes a plural expression except when two expressions are contextually different from each other. For example, as used herein, the singular forms "a," "an" and "the" are intended to include the plural forms as well, unless the context clearly indicates otherwise. The term "include" or "have" should be understood so as not to pre-exclude the existence of one or more other characteristics, figures, operations, components, elements or combinations thereof or additional possibilities. In addition, terms including ordinal numbers such as 'first', 'second', etc., are used for convenience of description to describe or differentiate between various elements but the elements should not be defined by these terms, and unless contextually having a different meaning are not intended to represent a required sequence or ordering.

FIG. 1 is a diagram of a computing apparatus 1 according to an embodiment.

Referring to FIG. 1, the computing apparatus 1 includes a graphic processing unit (GPU) 10, a central processing unit (CPU) 20, a memory 30, and a bus 40. While components related to the present example are illustrated in the computing apparatus 1 of FIG. 1, it is understood that those skilled in the art may include other general components.

As a non-exhaustive illustration only, the computing apparatus 1 described herein may refer to devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, video game consoles, television set-top boxes, e-book readers, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, or any other consumer electronics/information technology (CE/IT) device. In an example, the device may be implemented as various devices capable of sensing a user's eye movement. The device may also be implemented as a smart appliance, an intelligent vehicle, or in a smart home system. Thus, the computing apparatus 1 may be any apparatus having a graphics processing function for content display and may include various types of apparatuses.

In an example, the device may be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

The CPU 20 may be a hardware element that controls overall operations and functions of the computing apparatus 1. For example, the CPU 20 may drive an operating system (OS), call a graphics application programming interface (API) for the GPU 10, and execute a driver of the GPU 10. The CPU 20 may execute various applications stored in the memory 30, such as, for example, web browsing applications, game applications, and video applications.

The GPU 10 may be a dedicated graphic processor that performs various versions or types of graphics pipelines 100, such as, for example, open graphic(s) library (OpenGL), DirectX, and compute unified device architecture (CUDA). In an example, the GPU 10 may be a hardware element that performs a three-dimensional (3D) graphics pipeline so as to render 3D objects on a 3D image for transformation into a two-dimensional (2D) image to be displayed. For example, the GPU 10 may perform various functions such as shading, blending, illuminating, and various functions of generating pixel values to be displayed for pixels.

The GPU 10 may perform a tile-based graphics pipeline or a tile-based rendering (TBR). The term "tile-based" used herein means that rendering is performed on a per-tile basis after each frame of a video is divided or partitioned into a plurality of tiles. In a tile-based architecture, an amount of computation may be reduced compared to the case of processing a frame on a per-pixel basis. Hence, the tile-based architecture may be a graphics rendering method suitable for a device having a relatively low processing performance.

Referring to FIG. 1, the GPU 10 may perform graphics pipeline 100 including a binning pipeline 101 and a rendering pipeline 102. In an example, the binning pipeline 101 is a process of generating a tile list indicating tiles to which vertices, primitives, or patches making up 2D or 3D objects belong. The binning pipeline 101 may be used interchangeably with other term "tiling pipeline" or "binning phase". The rendering pipeline 102 is a process of rendering an object on a per-tile basis, based on the tile list generated by the binning pipeline 101. When the rendering pipeline 102 is completed, pixel representations of 2D or 3D objects to be displayed on a 2D display screen may be determined. The rendering pipeline 102 may be used interchangeably with other terms "rendering phase."

Some examples of graphics pipelines include pipelines, such as, for example, Microsoft's DirectX 11 (DX11) API, OpenGL 4.0 API, may include additional processing stages (tessellation stages) for tessellation of graphics primitives or graphics patches. Tessellation may be a process of dividing graphics patches into smaller graphics primitives to enable the display of an image having finer details. The graphics pipeline 100, which is driven by the GPU 10 of the computing apparatus 1, may support tessellation. In an example, the following examples may be performed by the GPU 10.

The memory 30 may be a hardware element that stores a variety of data processed by the computing apparatus 1. For example, the memory 30 may store data processed by the GPU 10 and the CPU 20 and data to be processed by the GPU 10 and the CPU 20. In addition, the memory 30 may store applications, drivers, and the like, which are to be driven by the GPU 10 and the CPU 20. The memory 30 may include read-only memory (ROM), electrically erasable programmable read-only memory (EEPROM), random-access memory (RAM), dynamic random access memory (DRAM), static random access memory (SDRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In an example, the memory 30 may include an external storage device accessible to the computing apparatus 1.

The bus 40 may be a hardware element that connects the hardware elements of the computing apparatus 1 so as to transmit and receive data between the hardware elements, for example. The bus 40 may include various types of buses, such as, for example, a peripheral component interconnect (PCI) bus and a PCI Express bus.

Figure 2:
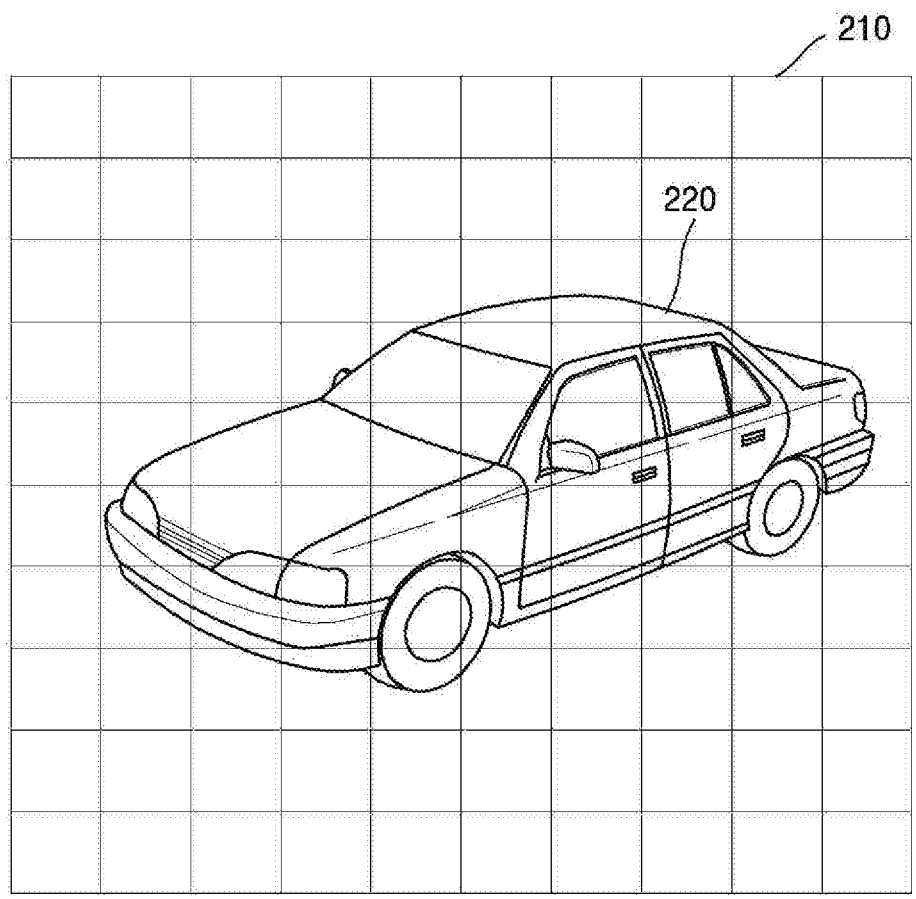
FIG. 2 is a diagram illustrating an example for describing tile-based rendering (TBR).

FIG. 2 is an example of a diagram for describing a TBR.

Referring to FIG. 2, a 3D vehicle object 220 corresponds to one frame of a video. The GPU 10 of FIG. 1 may divide one frame including the 3D vehicle object 220 into N×M tiles 210 (where N and M are natural numbers). In an example, the binning pipeline 101 of FIG. 1 may divide the frame including the 3D vehicle object 220 into the tiles 210 and determine in which tiles the 3D vehicle object 220 is present. The GPU 10 of FIG. 1 may convert the 3D vehicle object 220 included in the tiles 210 into pixel representations by rendering the 3D vehicle object 220 on a per-tile basis. In this case, the rendering pipeline 102 of FIG. 1 may convert the 3D vehicle object 220 into pixel representations by rendering the 3D vehicle object 220 on a per-tile basis. As described above, rendering the 3D vehicle object 220 included in one frame by using the tiles 210, and not on a per-pixel basis, is referred to as a tile-based rendering (TBR).

Figure 3:
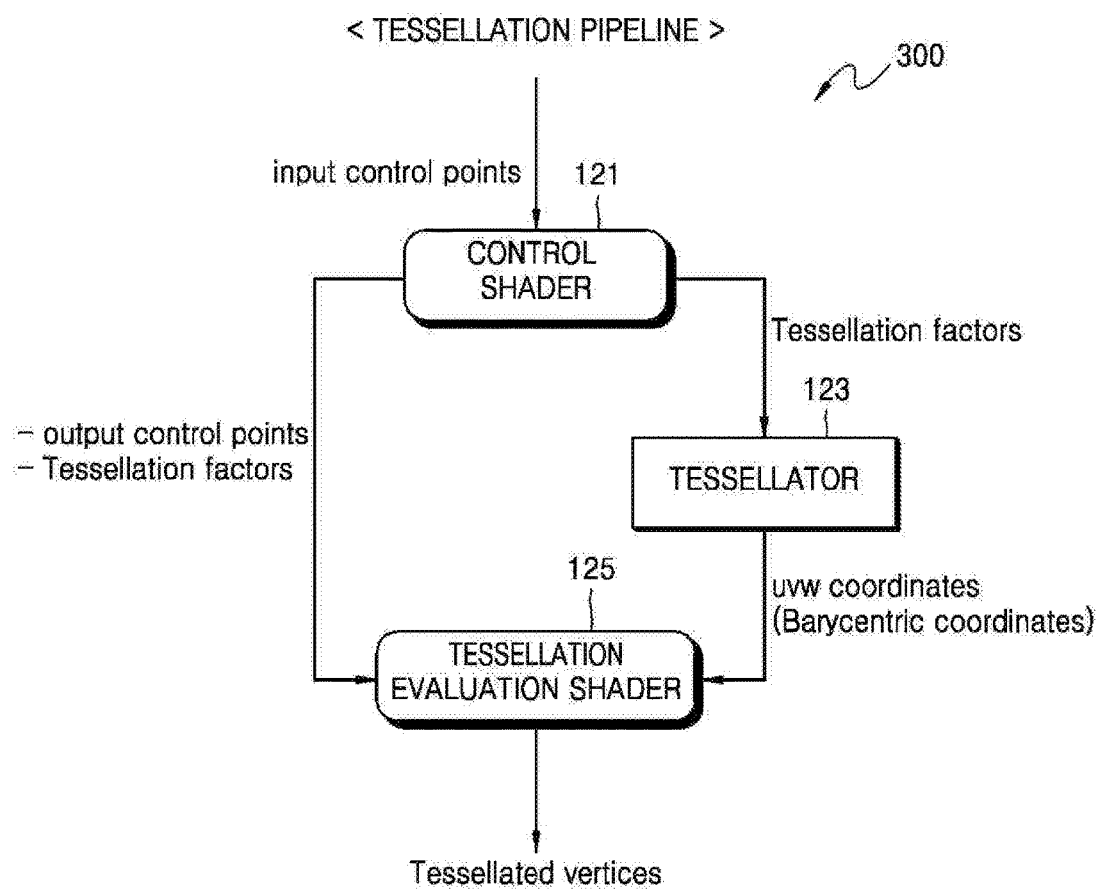
FIGS. 3 to 5 are diagrams illustrating examples for describing a tessellation pipeline.
Figure 4:
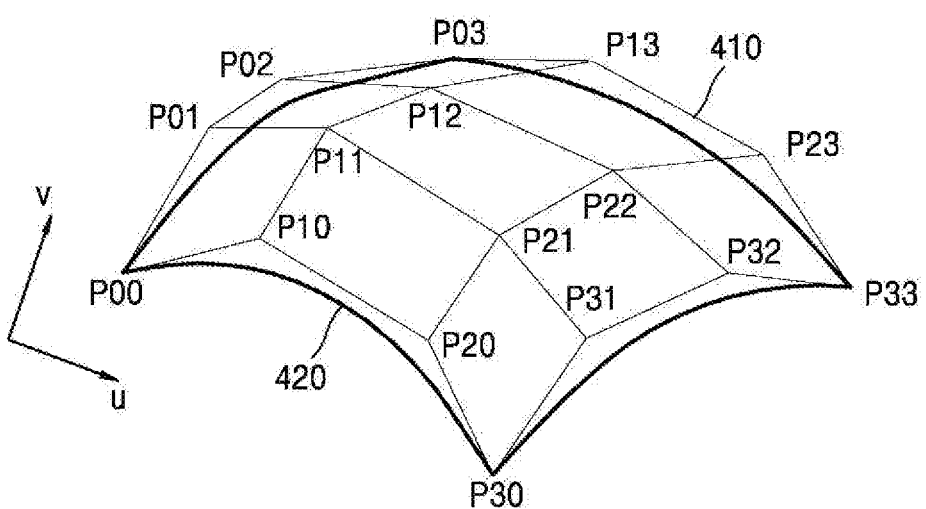
Figure 5:
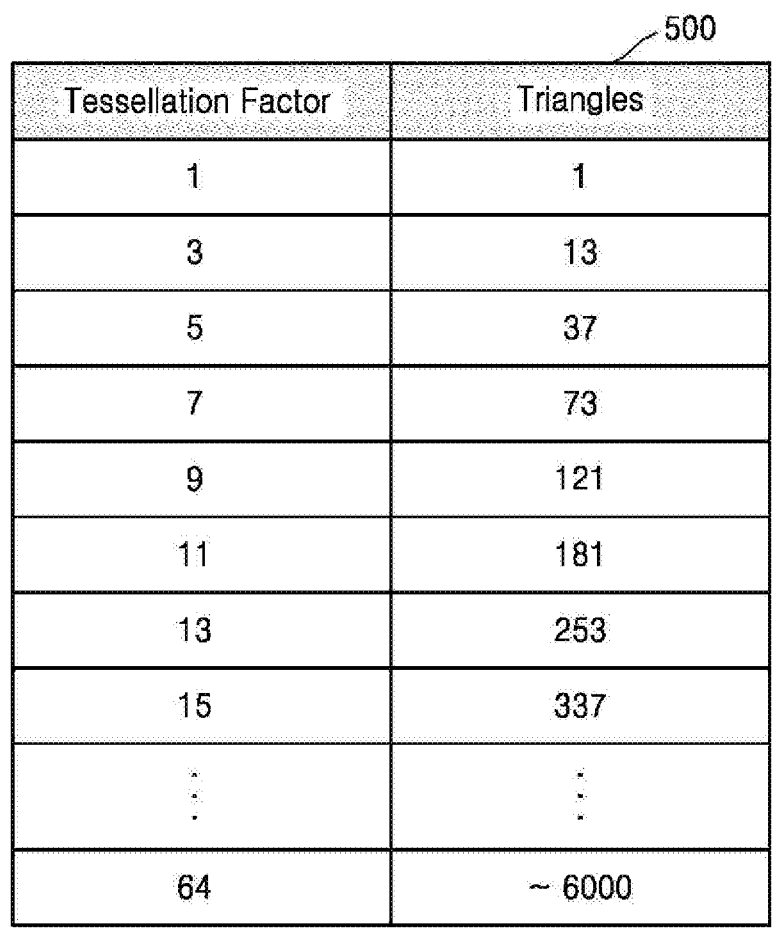

FIGS. 3 to 5 are examples of diagrams for describing a tessellation pipeline 300. The following description will be given with reference to FIGS. 3 to 5. As described above, the tessellation pipeline (or tessellation stage) 300 to be described with reference to FIGS. 3 to 5 may be included in the graphics pipeline 100 of FIG. 1.

Referring to FIG. 3, the tessellation pipeline 300 may be performed by a control shader 121, a tessellator 123, and a tessellation evaluation shader 125. The terms used in connection with the tessellation pipeline 300 described in this specification may be used interchangeably with other terms according to versions and types of the graphics pipeline 100. For example, the term "control shader" may be used interchangeably with "hull shader" and the term "tessellation evaluation shader" may be used interchangeably with "domain shader".

The control shader 121 may convert input control points expressing a low-order surface into output control points making up a patch. For example, the control shader 121 may perform conversion of the input control points to generate a patch 410 of a mesh made up of control points P00, P01, P02, P03, P10, P11, P12, P13, P20, P21, P22, P23, P30, P31, P32, and P33, as illustrated in FIG. 4. The patch 410 may have a polygonal shape, such as a triangle, a rectangle, or an isoline.

In addition to generating the output control points that make up the patch, the control shader 121 may determine a tessellation factor (TF) or a tessellation level (TL). The tessellation factor (TF) or the tessellation level (TL) may be an index indicating how many pieces the patch is divided into or how to divide the patch. A table 500 illustrated in FIG. 5 is a table that defines a relationship between the tessellation factor (TF) and the number of triangles to be divided. Since the number of triangles is 1 in the table 500 when the tessellation factor (TF) is 1, tessellation may not be performed on the patch. However, as the number of tessellation factors (TF) increases, the number of triangles increases exponentially. An increase in the number of triangles to be divided along with the increase in the number of tessellation factors (TF) may mean an increase in an amount of computation to be processed with respect to a patch by the GPU 10. As the number of tessellation factors (TF) increases, a patch of an object may be expressed more softly. The triangles are taken as an example of a polygon to be divided in the table 500 of FIG. 5, but the polygon is not limited thereto. The patch may be divided into other polygons, such as, for example, rectangles or isolines.

The control shader 121 may transfer information about the tessellation factor (TF) and the output control points of the output patch to the tessellator 123, and the tessellation evaluation shader 125.

The tessellator 123 may calculate uvw coordinates and weight values on a Barycentric coordinate system with respect to the output control points using the tessellation factor (TF) received from the control shader 121.

The tessellation evaluation shader 125 may generate tessellated vertices using the information about the tessellation factor (TF) and the output control points of the output patch received from the control shader 121, and the uvw coordinates and the weight values received from the tessellator 123. In an example, the w coordinate is optional. Referring to FIG. 4, positions of the tessellated vertices may make up a surface 420. The patches 410 may be converted into vertices (or primitives) on the surface 420 that is made softer by performing the tessellation pipeline.

Figure 6:
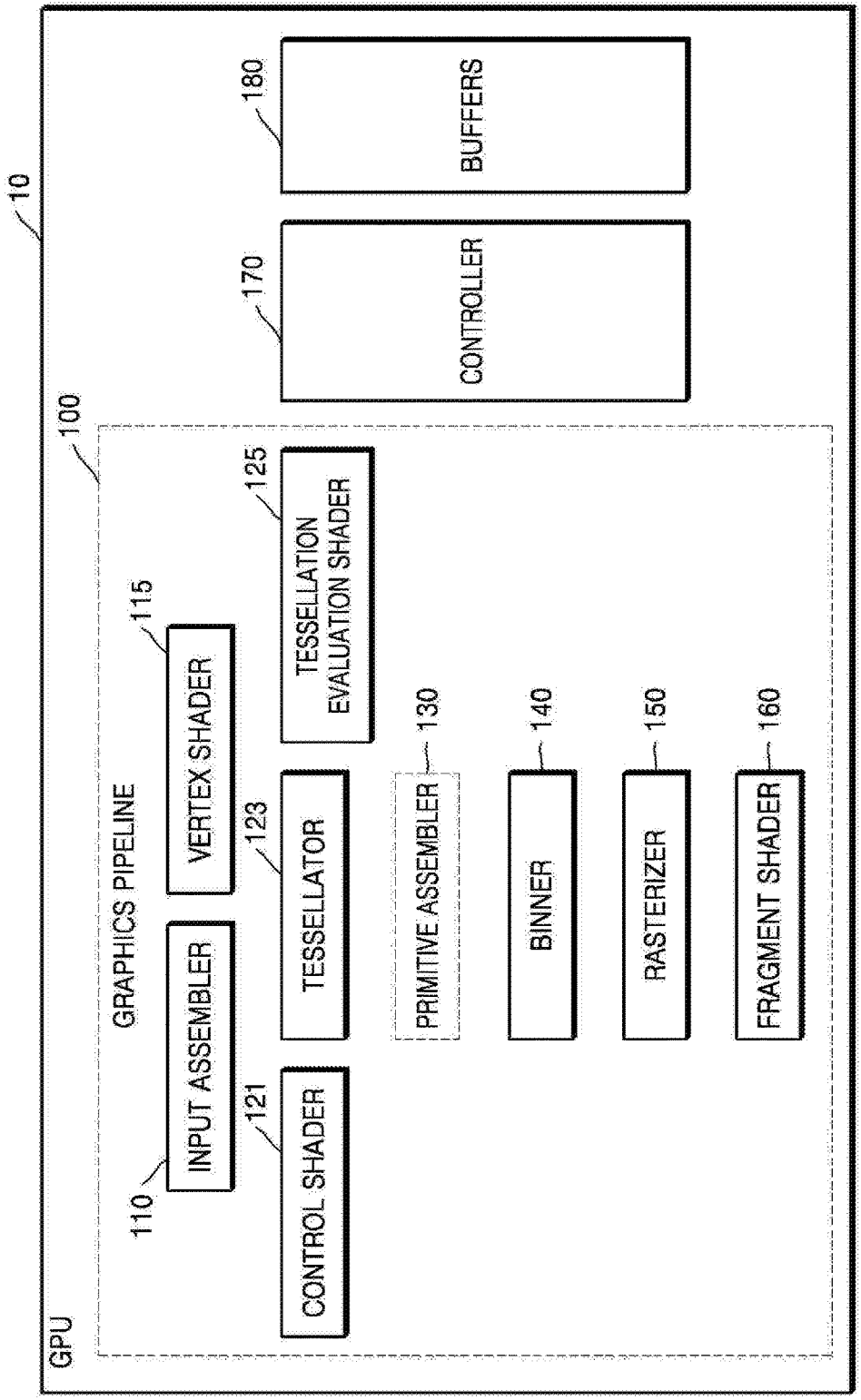
FIG. 6 is a diagram illustrating an example of a hardware configuration of a graphic processing unit (GPU) of FIG. 1.

FIG. 6 is a diagram illustrating an example of a hardware configuration of the GPU 10 of FIG. 1.

Referring to FIG. 6, the GPU 10 may include an input assembler 110, a vertex shader 115, a control shader 121, a tessellator 123, a tessellation evaluation shader 125, a primitive assembler 130, a binner 140, a rasterizer 150, and a fragment shader 160, which perform the graphics pipeline 100. In an example, the GPU 10 further includes a controller 170 and buffers 180. The above elements that perform the graphics pipeline 100 within the GPU 10 may be classified based on functions to be described below, and the above elements that perform the graphics pipeline 100 may be implemented by sub processing units (or processor cores) included in the GPU 10. That is, the implementation of the above elements that perform the graphics pipeline 100 may not be particularly limited to any one. The names of the above elements that perform the graphics pipeline 100 may be given based on the functions to be described below, but it will be understood by those of ordinary skill in the art that the names may be variously changed.

For convenience of description, the elements that perform the graphics pipeline 100 within the GPU 10 are assigned names defined in open graphics library (OpenGL), but the names of the elements are not limited thereto. In an example, the elements that perform the graphics pipeline 100 within the GPU 10 may correspond to similar elements defined in other types of APIs, such as, for example, Microsoft's DirectX 11 (DX11) and compute unified device architecture (CUDA) 6.0. For example, it will be understood by those of ordinary skill in the art that the tessellation evaluation shader 125 may correspond to the domain shader used in the DirectX 11, and similarly, other elements in the GPU 10 may correspond to elements used in other APIs.

The input assembler 110 may supply data of the vertices associated with objects stored in the memory (30 in FIG. 1) to the graphics pipeline 100, based on the input drawcalls. The vertices supplied by the graphics pipeline 100 may be related to a mesh or a patch that is an expression of a surface, but are not limited thereto. The drawcall is a command indicating a frame on which an object is to be rendered and the object to be rendered on the frame. For example, the drawcall may be a command for drawing primitives, such as triangles or rectangles, on an image or a frame.

The vertex shader 115 may transfer the vertices supplied by the input assembler 110 as the input control points of the control shader 121.

The control shader 121, the tessellator 123, and the tessellation evaluation shader 125 may perform the tessellation pipeline 300 described above with reference to FIG. 3. In an example, the input control points, which are input to the control shader 121, may be output by the tessellation evaluation shader 125 as the tessellated vertices associated with the output patch.

When the tessellation pipeline 300 is performed, the primitive assembler 130 may convert the tessellated vertices into primitives (i.e., tessellated primitives). When the tessellation pipeline 300 is not performed, the primitive assembler 130 may convert the vertices output from the vertex shader 115 into primitives.

The binner 140 may perform binning or tiling using the primitives (or tessellated primitives) output from the primitive assembler 130. In an example, the binner 140 may generate (bin) a tile list indicating information about tiles to which each output primitive belongs by performing a depth test (or tile Z test). In another example, the binner 140 may generate a visibility bitstream, such as, for example, a bounding box bitstream (first bitstream), a drawcall bitstream (second bitstream), a primitive bitstream (third bitstream), or a tessellation bitstream, which will be described with reference to FIGS. 8 to 11.

The rasterizer 150 may convert the output primitives into pixel values of a 2D space based on the generated tile list. A fragment may mean pixels covered by the primitives. The fragment shader 160 may generate the primitives and determine a depth value, a stencil value, a color value, and the like of the fragment. A shading result of the fragment shader 160 may be stored in the buffers 180 (e.g., frame buffer) and may be displayed as a frame of a video.

The controller 170 may control overall operations and functions of the elements 110 to 150 of the graphics pipeline 100 and the buffers 180.

Figure 7:
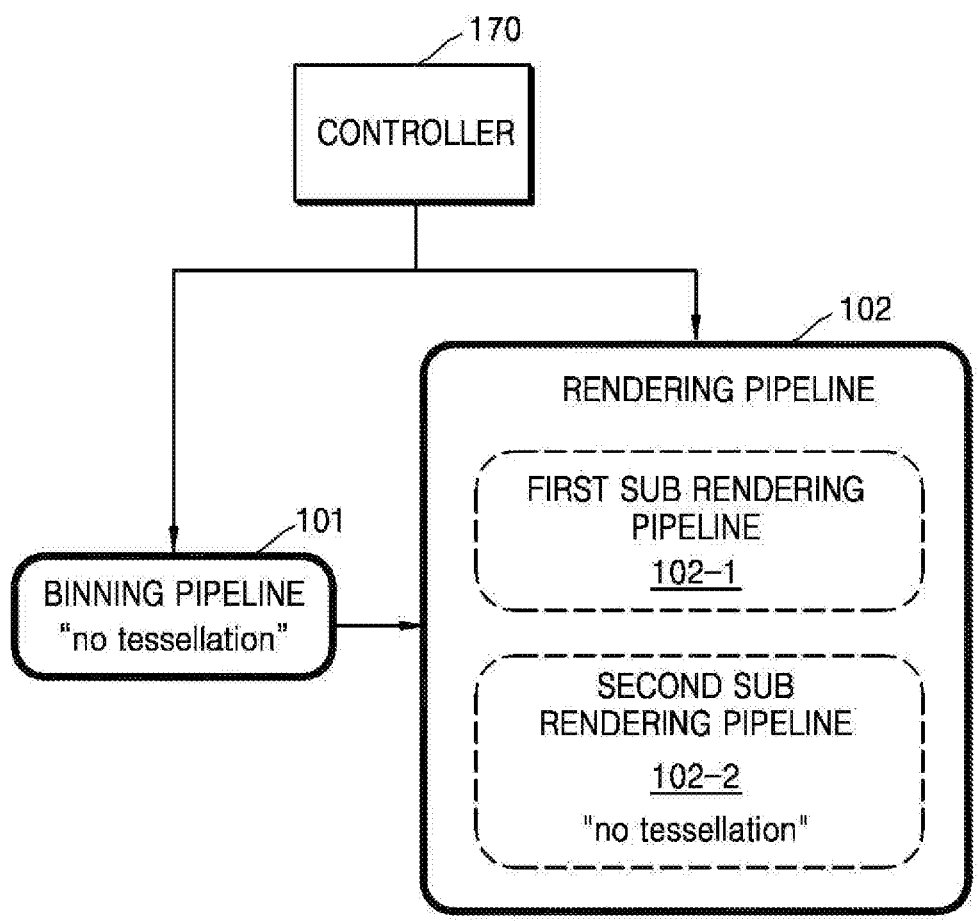
FIG. 7 is a diagram illustrating an example of a graphics pipeline.

FIG. 7 is a diagram of a graphics pipeline, according to an embodiment.

Referring to FIG. 7, the controller 170 may control the operations of the binning pipeline 101 and the rendering pipeline 102.

There is no tessellation in the binning pipeline 101. As described above with reference to FIG. 3, since data about a plurality of triangles is generated when the tessellation pipeline 300 is performed, many hardware/software resources are needed to process the data. Therefore, when the tessellations are repeatedly performed in both the binning pipeline 101 and the rendering pipeline 102 and many tessellated primitives are generated accordingly, an amount of computation may increase exponentially and a computation processing speed may be lowered. In an example, the graphics pipeline (100 in FIG. 1) may perform deferred tessellation. The graphics pipeline (100 in FIG. 1) may perform tessellation in the rendering pipeline 102, without performing tessellation in the binning pipeline 101.

In an example, the rendering pipeline 102 may include a first sub rendering pipeline 102-1 and a second sub rendering pipeline 102-2. The first sub rendering pipeline 102-1 may be a pipeline that performs the tessellation pipeline 300 and the second sub rendering pipeline 102-2 may be a pipeline that does not perform the tessellation pipeline 300. For the same reason that tessellation is not performed in the binning pipeline 101 (e.g., the decrease in the amount of computation, the increase in the processing speed, etc.), sub pipelines that does not perform tessellation may exist even in the rendering pipeline 102.

Figure 8:
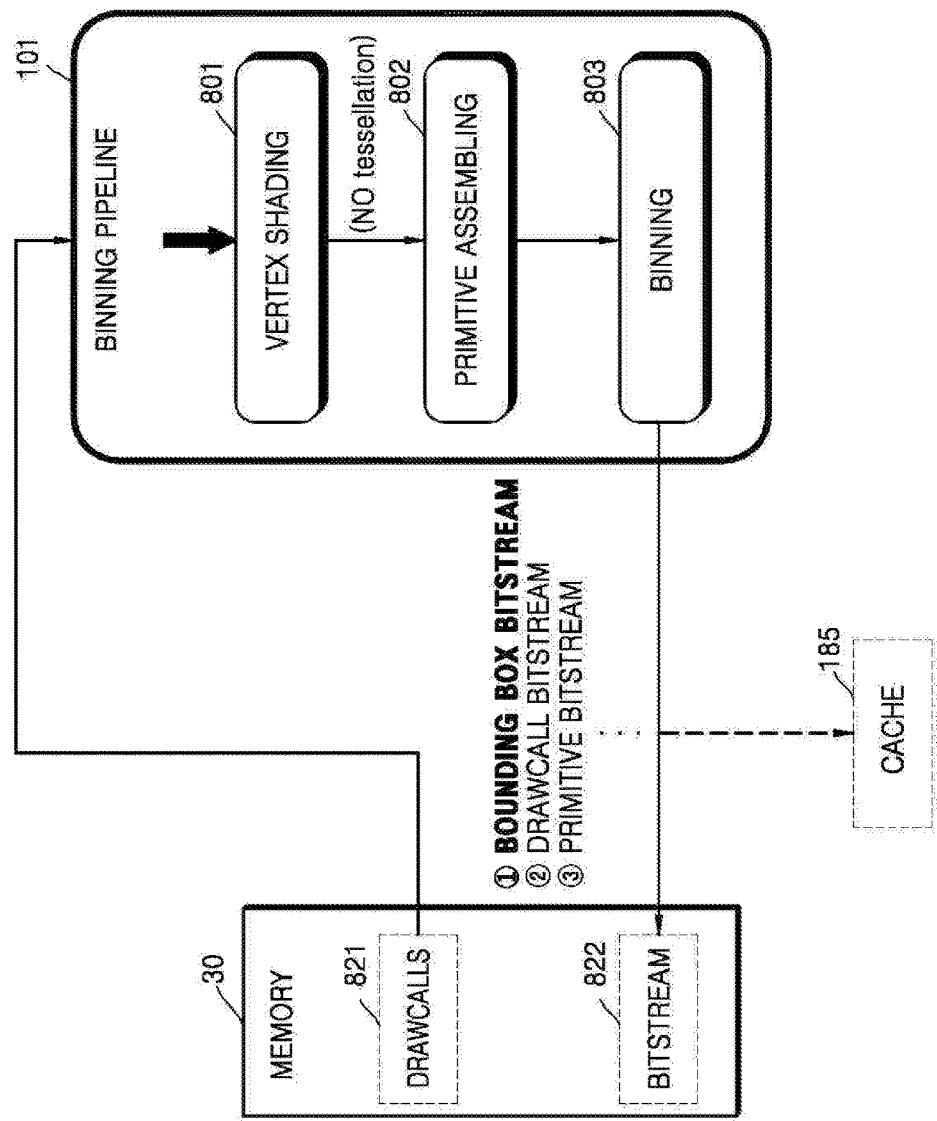
FIG. 8 is a diagram illustrating an example of a binning pipeline.

FIG. 8 is a diagram of a binning pipeline 101, according to an embodiment.

The binning pipeline 101 illustrated in FIG. 8 will be described in connection with the hardware configuration of the GPU 10 described with reference to FIG. 6. In FIG. 8, only elements and pipeline stages associated with the present embodiment are described. Therefore, it will be understood by those of ordinary skill in the art that other general elements and pipeline stages except for the elements and pipeline stages illustrated in FIG. 8 may be included, without departing from the spirit and scope of the illustrative examples described.

Drawcalls 821 provided from the memory 30 may be input to the binning pipeline 101. The drawcalls 821 may correspond to draw commands associated with an object to be rendered in a current image frame.

The vertex shader 115 may perform vertex shading 801 for generating vertices from the input drawcalls 821. The vertex shader 115 may transfer the generated vertices to the primitive assembler 130. The primitive assembler 130 may perform primitive assembling 802 to convert the vertices output from the vertex shader 115 into a set of primitives. The binning pipeline 101 may be set such that tessellation is not performed between the vertex shading 801 and the primitive assembling 802. Therefore, tessellated primitives may not be generated in the binning pipeline 101.

The binner 140 may perform binning 803 or tiling using the primitives output from the primitive assembler 130. The binner 140 may perform binning 803 to predict a tile list indicating information about tiles to which the primitives belong by performing a depth test (or a tile Z test), culling, clipping, hidden surface removal (HSR), and the like. In an example, the predicted tile list may be stored in the memory 30 as a bitstream 822. In another example, a result of the binning 803 by the binner 140 may be stored in a cache 185 provided in the buffers 180 of the GPU 10, instead of the memory 30, for faster access. The binner 140 may perform the binning 803 to generate visibility bitstreams, such as a bounding box bitstream, a drawcall bitstream, a primitive bitstream, and the like. The drawcall visibility bitstream may include information indicating visibility of each drawcall in each tile, and the primitive bitstream may include information indicating visibility of each primitive in each tile.

Figure 9:
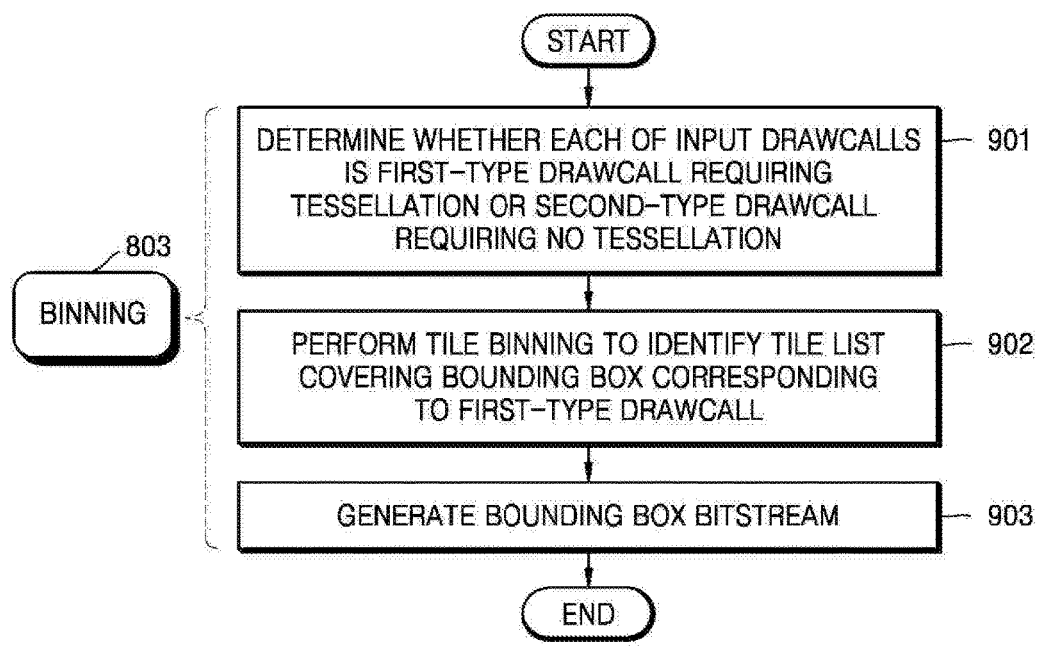
FIG. 9 is a diagram illustrating an example of a method of generating a bounding box bitstream.

FIG. 9 is a diagram illustrating an example of a method of generating a bounding box bitstream. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. In addition to the description of FIG. 9 below, the above descriptions of FIGS. 1-8, are also applicable to FIG. 9, and are incorporated herein by reference. Thus, the above description may not be repeated here.

Referring to FIG. 9, in 901, the binner 140 may determine whether each of input drawcalls are a first-type drawcall requiring tessellation or a second-type drawcall that do not require tessellation.

In 902, the binner 140 may perform tile binning to identify a tile list that covers a bounding box corresponding to the first-type drawcall. In another example, the binner 140 may not perform the tile binning on a bounding box corresponding to the second-type drawcall because the second-type drawcall, which does not requires tessellation, will not be tessellated even in the rendering pipeline.

In 903, the binner 140 may generate a bounding box bitstream including identification information indicating the first-type drawcall, identification information indicating the second-type drawcall, and information about the tile list based on the result of the tile binning of the bounding box. The bounding box bitstream may include information indicating whether tessellation is needed with respect to each of the input drawcalls and information about the tile list that covers the bounding box corresponding to the first-type drawcall requiring the tessellation.

In another example, a process of generating the bounding box bitstream in operations 901 to 903 may be performed in the stage of the binning 803 described with reference to FIG. 8.

Figure 10:
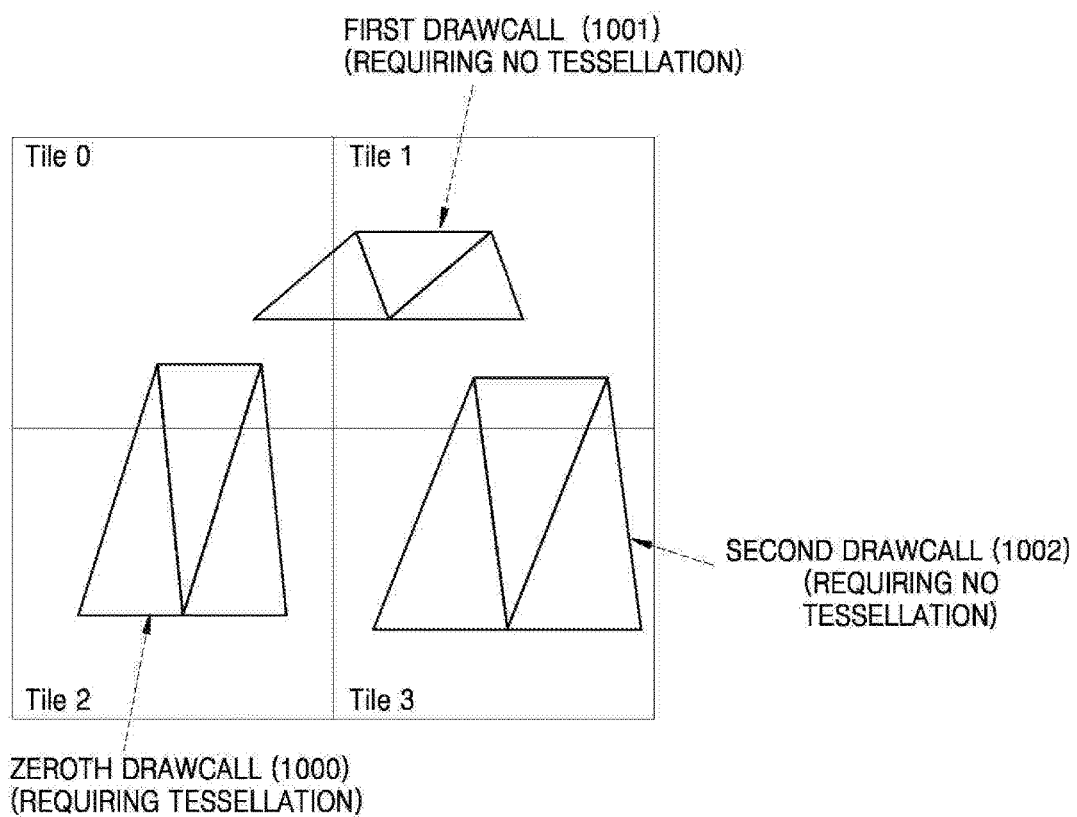
FIG. 10 is a diagram illustrating examples of drawcalls covered by 2×2 tiles.

FIG. 10 is a diagram illustrating examples of drawcalls covered by 2×2 tiles.

Referring to FIG. 10, a zeroth drawcall 1000, a first drawcall 1001, and a second drawcall 1002 may be covered by 2×2 tiles, i.e., a tile 0 to a tile 3. The example of FIG. 10 is only for convenience of description, and the present embodiment is not limited thereto. Each of the drawcalls 1000, 1001, and 1002 may include three primitives. In this case, it is assumed that the zeroth drawcall 1000 corresponds to a drawcall requiring tessellation and the first and second drawcalls 1001 and 1002 correspond to drawcalls requiring no tessellation.

Referring to 901 described above with reference to FIG. 9, the binner 135 may determine that the zeroth drawcall 1000 corresponds to the first-type drawcall and the first and second drawcalls 1001 and 1002 correspond to the second-type drawcall. Referring to operation 902 described above with reference to FIG. 9, the binner 135 may determine a bounding box corresponding to the zeroth drawcall 1000 and identify a tile list (tile 0 and tile 2) covering the bounding box corresponding to the zeroth drawcall 1000 through tile binning. The tile list identified by the tile binning performed on the tessellated primitives generated from the first-type drawcall may be included in the tile list identified by tile binning performed on the bounding box corresponding to the first-type drawcall. This is because a space defined by the tessellated primitives generated from the first-type drawcall is not different than the bounding box corresponding to the first-type drawcall. Details will be described below with reference to FIG. 11.

Figure 11:
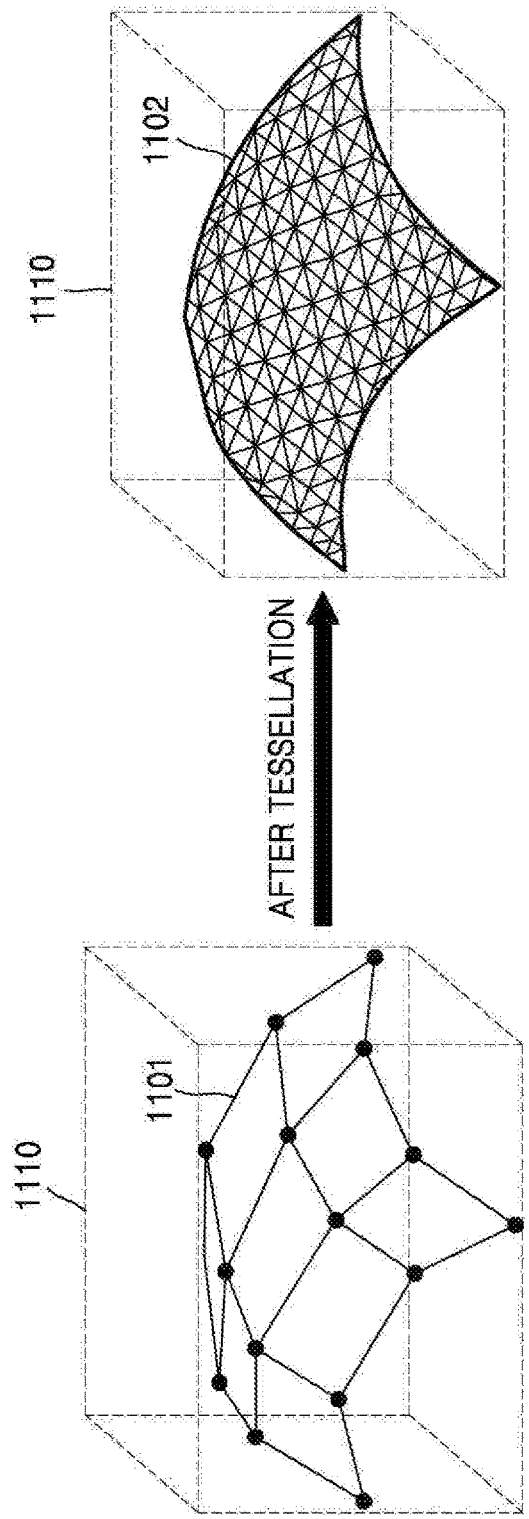
FIG. 11 is a diagram illustrating an example for describing an inclusion relationship between a space of a bounding box and a space defined by tessellated primitives.

FIG. 11 is a diagram illustrating an example for describing an inclusion relationship between a space of a bounding box 1110 and a space defined by tessellated primitives 1102.

Referring to FIG. 11, the bounding box 1110 corresponding to first-type drawcalls 1101 may include a space defined by the first-type drawcalls 1101. After the first-type drawcalls 1101 are tessellated, a space defined by the tessellated primitives 1102 may not be deviated from the bounding box 1110, because the graphics API sets the bounding box 1110 such that the space defined by the tessellated primitives 1102 is included therein.

When tile binning is performed on the bounding box even though no tessellation is performed in the binning pipeline (101 in FIG. 8), it is possible to obtain a similar result to that obtained by performing tile binning on tessellated primitives. Therefore, the tessellation pipeline (tessellation stage) may be skipped in the binning pipeline (101 in FIG. 8). Thus, reducing an amount of computation and improving a processing speed in the GPU 10, as compared to tessellation being performed in the binning pipeline (101 in FIG. 8).

Figure 12:
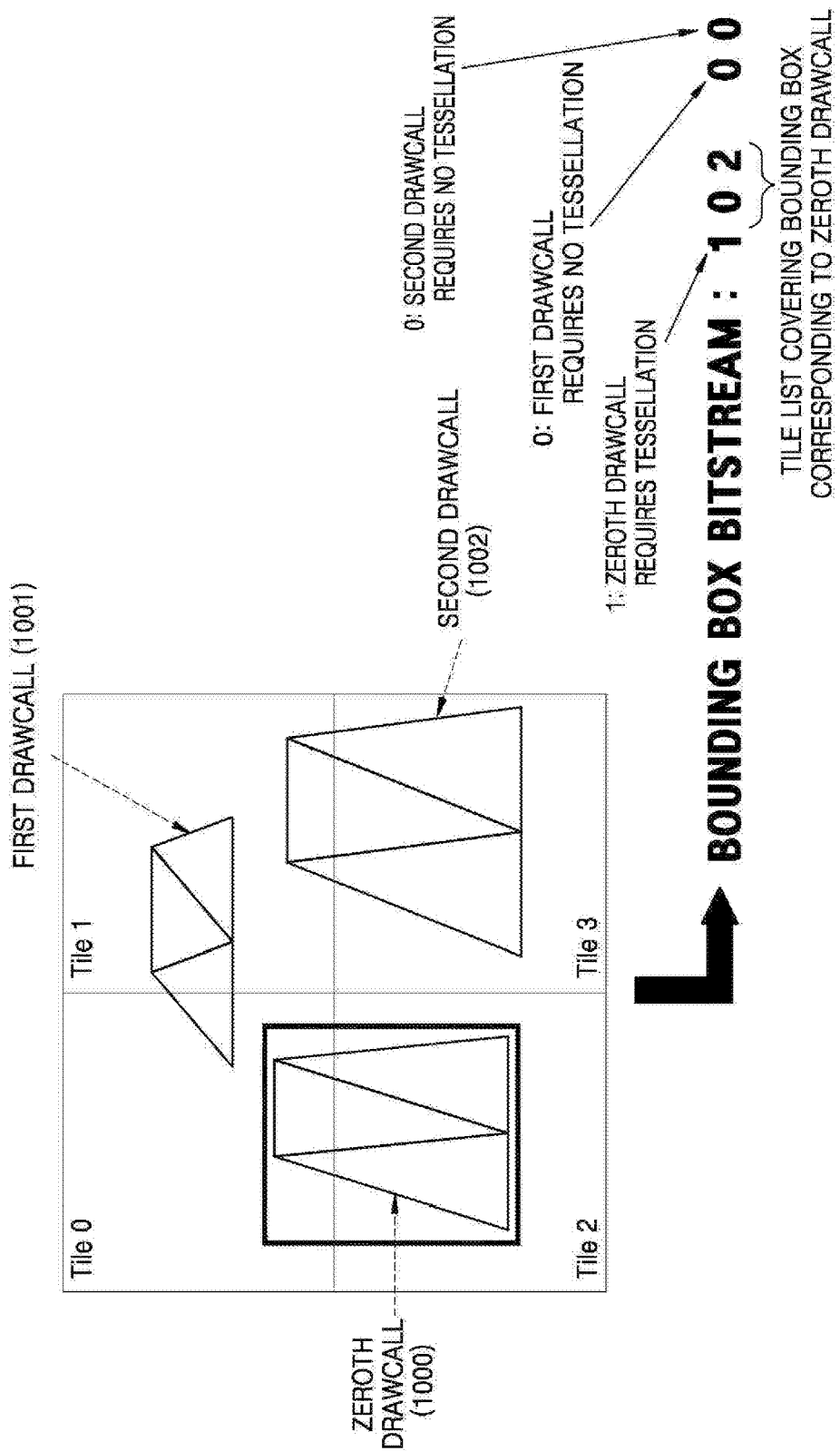
FIG. 12 is a diagram illustrating an example for describing generation of a bounding box bitstream.

FIG. 12 is a diagram for describing generation of a bounding box bitstream, according to an embodiment.

Referring to FIG. 12, it is assumed that a zeroth drawcall 1000 corresponds to a drawcall requiring tessellation and first and second drawcalls 1001 and 1002 correspond to drawcalls that do not require tessellation.

As to "1 0 2" in the bounding box bitstream illustrated in FIG. 12, "1" at the head may mean that tessellation is needed with respect to the zeroth drawcall 1000, and "0 2" subsequent to "1" may mean that tiles covering the bounding box 1200 corresponding to the drawcall 1000 are "tile 0" and "tile 2". "0 0" subsequent to "1 0 2" in the bounding box bitstream may mean that tessellation is not needed for the first and second drawcalls 1001 and 1002.

The bounding box bitstream may include information indicating whether tessellation is needed with respect to each of the input drawcalls 1000, 1001, and 1002, and information about a tile list covering the bounding box 1200 corresponding to the drawcall 1000 requiring tessellation. In other examples, a form of a bitstream, such as "1 0 2 0 0" described above with reference to FIG. 12, may be variously changed as long as the bitstream is capable of including information described above.

FIG. 13 is a diagram for describing various types of visibility bitstreams, according to an embodiment.

Referring to FIG. 13, the binner 140 may generate a bounding box bitstream, a drawcall bitstream, a primitive bitstream, and a tessellation bitstream. The bounding box bitstream may be a bitstream generated in the binning pipeline 101, and the tessellation bitstream may be a bitstream generated in the rendering pipeline 102.

Since the bounding box bitstream is substantially the same as that described with reference to FIG. 12, detailed descriptions of the bounding box bitstream will be omitted.

The drawcall bitstream and the primitive bitstream may be generated with respect to second-type drawcalls requiring no tessellation (for example, the first and second drawcalls 1001 and 1002) because visibility of the first-type drawcall requiring tessellation (for example, the zeroth drawcall 1000) has been reflected to the bounding box bitstream.

The drawcall bitstream is a bitstream for identifying a visible drawcall in each tile. For example, since a tile 0 covers a first drawcall 1001, "1 0" is assigned to the tile 0. Since a tile 1 covers both the first and second drawcalls 1001 and 1002, "1 1" is assigned to the tile 1. Since a tile 2 does not cover either the first or the second drawcalls 1001 and 1002, "0 0" is assigned to the tile 2. Since a tile 3 covers the second drawcall 1002, "0 1" is assigned to the tile 3.

The primitive bitstream is a bitstream for identifying a visible drawcall in each tile. For example, since the tile 0 covers only a primitive P0 of the first drawcall 1001, "1 0 0 0 0 0" is assigned to the tile 0. Since the tile 1 covers all primitives of the first and second drawcalls 1001 and 1002, "1 1 1 1 1 1" is assigned to the tile 1. Since the tile 2 does not cover any primitives of the first and second drawcalls 1001 and 1002, "0 0 0 0 0 0" is assigned to the tile 2. Since the tile 3 covers primitives P0, P1, and P3 of the second drawcall 1002, "0 0 0 1 1 1" is assigned to the tile 3.

As described above, the tessellation bitstream may be generated after the tessellation is performed in the rendering pipeline 102. The tessellation bitstream is a bitstream for identifying a visible tessellated primitive in each tile. Since the tessellation is performed on only the zeroth drawcall 1000 and the bounding box corresponding to the zeroth drawcall 1000 is defined as "0 2" in the bounding box bitstream, the tessellation bitstream may include only visibility information of the tile 0 and the tile 2. Since the tile 0 covers the primitives P0, P1, and P3 of the zeroth drawcall 1000, "1 1 1" is assigned to the tile 0. Since the tile 2 also covers the primitives P0, P1, and P3 of the zeroth drawcall 1000, "1 1 1" is assigned to the tile 2.

As described above, the rendering pipeline 102 may perform rendering using the visible bounding box, the visible drawcall, and the visible primitive in a current tile to be processed based on various types of visibility bitstreams and may also skip rendering a tile where a visible object is not present, thereby reducing an amount of computation and increasing a processing speed in the GPU 10.

Figure 14:
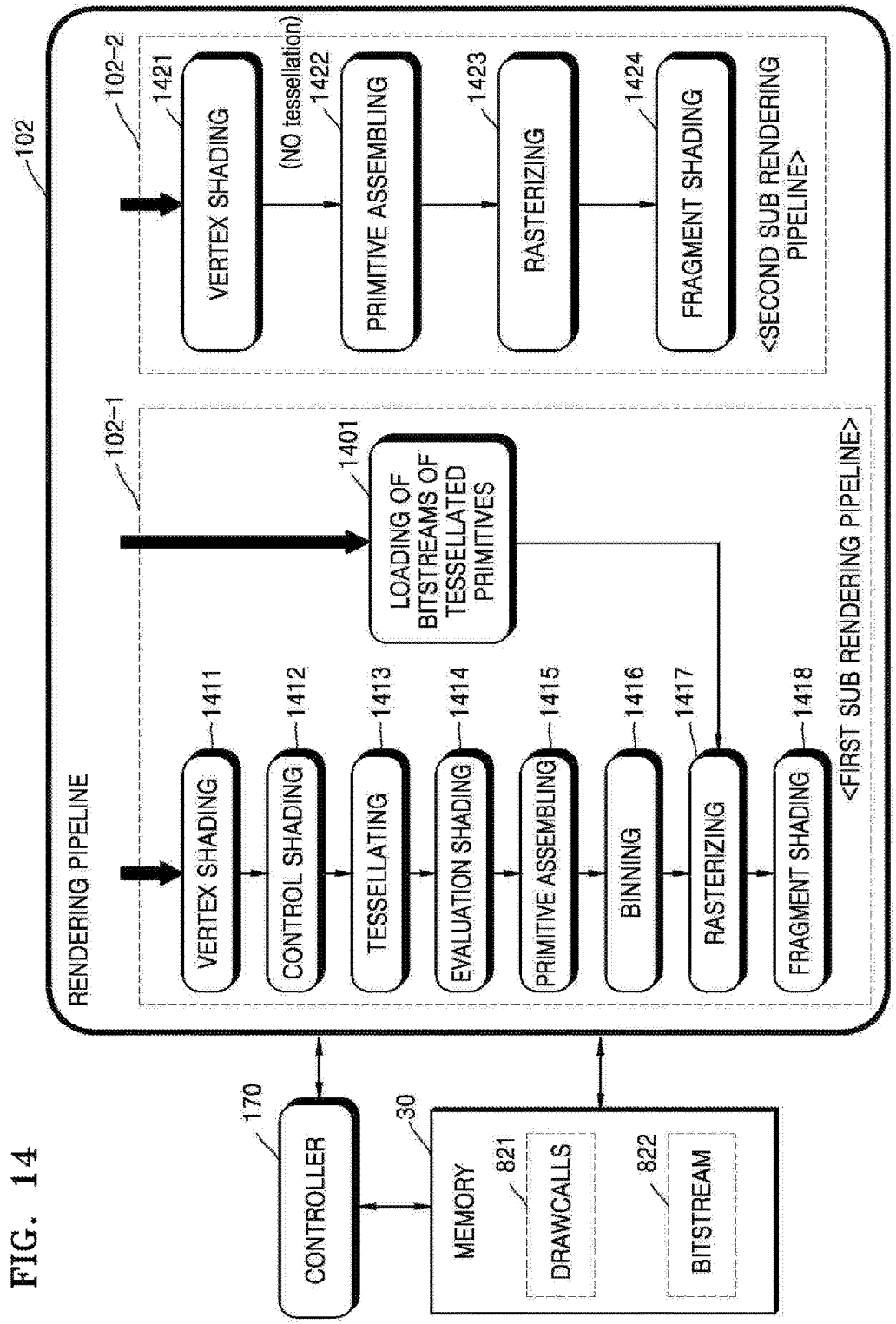
FIG. 14 is a diagram illustrating an example for describing a rendering pipeline.

FIG. 14 is a diagram for describing a rendering pipeline 102, according to an embodiment.

The rendering pipeline 102 illustrated in FIG. 14 is described in connection with the hardware configuration of the GPU 10 described with reference to FIG. 6. Elements and pipeline stages associated with the present embodiment will be described below. Therefore, it will be understood by those of ordinary skill in the art that other general elements and pipeline stages except for the elements and pipeline stages illustrated in FIG. 14 may be further included.

The rendering pipeline 102 may render tiles in different rendering schemes with respect to a first-type drawcall requiring tessellation and a second-type drawcall, which does not require tessellation, using the bounding box bitstream generated in the binning pipeline 101. In an example, the first-type drawcall may be processed by a first sub rendering pipeline 102-1 including a tessellation stage, and the second-type drawcall may be processed by a second sub rendering pipeline 102-2 including no tessellation stage. When a bounding box allocated by the bounding box bitstream is identified in a current tile to be processed, the rendering pipeline 102 may render the current tile by performing selective tessellation, i.e, the rendering pipeline 102 may perform tessellation on a drawcall corresponding to the identified bounding box and not perform tessellation on the other drawcalls.

The controller 170 of the GPU 10 may schedule a rendering order of the tiles based on the result of the tile binning included in the bounding box bitstream, such that a high priority is assigned to a tile covering the bounding box. Accordingly, the rendering pipeline 102 may perform rendering on a per-tile basis according to the scheduled rendering order of the tiles.

The drawcalls 821 provided from the memory 30 are input to the rendering pipeline 102. The controller 170 may determine whether each of the input drawcalls 821 is a first-type drawcall or a second-type drawcall. The controller 170 may control the operation of the first sub rendering pipeline 102-1 with respect to the first-type drawcall and control the operation of the second sub rendering pipeline 102-2 with respect to the second-type drawcall.

The first sub rendering pipeline 102-1 may perform rendering stages of operations 1411 through 1418 on the first-type drawcall on which the tessellation has not been performed in a previous tile. The first sub rendering pipeline 102-1 may perform rendering stages of operations 1401, 1417, and 1418 on the first-type drawcall on which the tessellation has been performed in the previous tile and the tessellation bitstream generated by the tessellation has been stored in the memory 30. Thus, by not repeating the tessellation operation on the first-type drawcall on which the tessellation has been performed, the amount of computation of the GPU 10 may be reduced.

In the following description, the zeroth, first, and second drawcalls 1000, 1001, and 1002 covered by the 2×2 tiles, which have been described above with reference to FIGS. 10 to 13, will be taken as an example. The first sub rendering pipeline 102-1 is performed on the zeroth drawcall 1000, and the second sub rendering pipeline 102-2 is performed on the first and second drawcalls 1001 and 1002. In another example, it may be assumed that the bounding box corresponding to the zeroth drawcall 1000 is covered by the tile 0 and the tile 2, and the rendering order is scheduled such that the tile 0 is rendered earlier than the tile 2. Since all primitives P0, P1, and P2 of the zeroth drawcall 1000 are covered in the tile 0, tessellated primitives for the primitives P0, P1, and P2 may be generated and may be stored in a bitstream 822 of the memory 30 when the tessellation on the tile 0 is completed. When the tile 2 (current tile) is rendered, the tessellation may not be needed because the primitives tessellated by rendering the tile 0 (previous tile) have been already generated. Therefore, when the tile 2 (current tile) is rendered, tessellation is skipped, data of tessellated primitives stored in the bitstream 822 of the memory 30 is loaded, and the remaining rendering stages are performed.

The rendering stages of operation 1411 to 1418 to be performed on the first-type drawcall, i.e., drawcall to be initially tessellated, on which tessellation has not been performed in the previous tile will be described below.

The vertex shader 115 may perform vertex shading 1411 to generate vertices from the first-type drawcall among the drawcalls 821. The vertex shader 115 may transfer the generated vertices to the control shader 121.

As described above with reference to FIG. 3, the control shader 121, the tessellator 123, and the tessellation evaluation shader 125 may generate tessellated vertices by performing control shading 1412, tessellating 1413, and tessellation evaluation shading 1414 using the vertices.

The primitive assembler 130 may perform primitive assembling 1415 to convert the tessellated vertices into a set of tessellated primitives.

The binner 140 may perform binning 1416 or tiling using the tessellated primitives output from the primitive assembler 130. That is, the binner 140 may perform binning 1416 to predict a tile list indicating information about tiles to which the tessellated primitives belong by performing a depth test (or a tile Z test), culling, clipping, hidden surface removal (HSR), and the like. Furthermore, the binner 140 may generate a visibility bitstream, such as a tessellation bitstream, by performing binning 1416 and store the visibility bitstream in the bitstream 822 of the memory 30. As described above, for faster access, the generated visibility bitstream may be stored in the cache (185 in FIG. 8) provided in the buffers 180 of the GPU 10, instead of the memory 30. Information about coordinates of the tessellated primitives may also be stored in the memory 30 or the cache 185.

The rasterizer 150 may perform rasterizing 1417 to convert the tessellated primitives into pixel values in a 2D space by using visibility bitstreams stored in the memory 30 or the cache 185. The fragment shader 160 may generate a fragment and perform fragment shading 1418 to determine a depth value, a stencil value, a color value, and the like of the fragment. A result of the fragment shading 1418 performed by the fragment shader 160 may be stored in the buffers 180 (for example, frame buffer) and may be displayed as a frame of a video.

Rendering stages of operations 1401, 1417, and 1418 to be performed on the first-type drawcall on which tessellation has been performed in a previous tile will be described below.

In operation 1401, tessellation bitstream and coordinate data of tessellated primitives are loaded from the memory 30 or the cache 185. The rasterizer 150 may perform rasterizing 1417 to convert the tessellated primitives into pixel values in the 2D space using the loaded tessellation bitstream and the loaded coordinate data of the tessellated primitives. The fragment shader 160 may generate a fragment and perform fragment shading 1418 to determine a depth value, a stencil value, a color value, and the like of the fragment. A result of the fragment shading 1418 performed by the fragment shader 160 may be stored in the buffers 180 (for example, frame buffer) and may be displayed as a frame of a video.

The second sub rendering pipeline 102-2 may be performed on the second-type drawcall. Since the second-type drawcall requires no tessellation, the second sub rendering pipeline 102-2 may not include a tessellation pipeline (tessellation stage), such as operations 1412 to 1414. Where the tessellated primitives for the first-type drawcall to be processed in the current tile have been generated in the previous tile, tessellation for a drawcall to be processed in the current tile may be skipped.

The vertex shader 115 may perform vertex shading 1421 to generate vertices from the second-type drawcall of the drawcalls 821. The vertex shader 115 may transfer the generated vertices to the primitive assembler 130.

The primitive assembler 130 may perform primitive assembling 1422, which converts the vertices output from the vertex shader 115 into primitives.

The rasterizer 150 may perform rasterizing 1423 to convert the tessellated primitives into pixel values in the 2D space by using visibility bitstreams (drawcall bitstreams, primitive bitstreams, and the like) stored in the memory 30 or the cache 185. The fragment shader 160 may generate a fragment and perform fragment shading 1424 to determine a depth value, a stencil value, a color value, and the like of the fragment. A result of the fragment shading 1424 performed by the fragment shader 160 may be stored in the buffers 180 (for example, frame buffer) and may be displayed as a frame of a video.

On the other hand, where the tessellated primitives for the first-type drawcall are not used in other tiles to be subsequently processed, the controller 170 may control the operations such that data associated with the tessellated primitives is deleted from the memory 30 and the cache 185 while the rendering pipeline is performed.

As described above, in the rendering pipeline 102, different types of sub rendering pipelines 102-1 and 102-2 may be performed according to a type of an input drawcall, i.e., whether the input drawcall is a first-type drawcall or a second-type drawcall. Tessellation is performed only on drawcalls requiring tessellation, without being unconditionally performed on all drawcalls, thereby improving a processing speed while reducing an amount of computation of the GPU 10.

Figure 15:
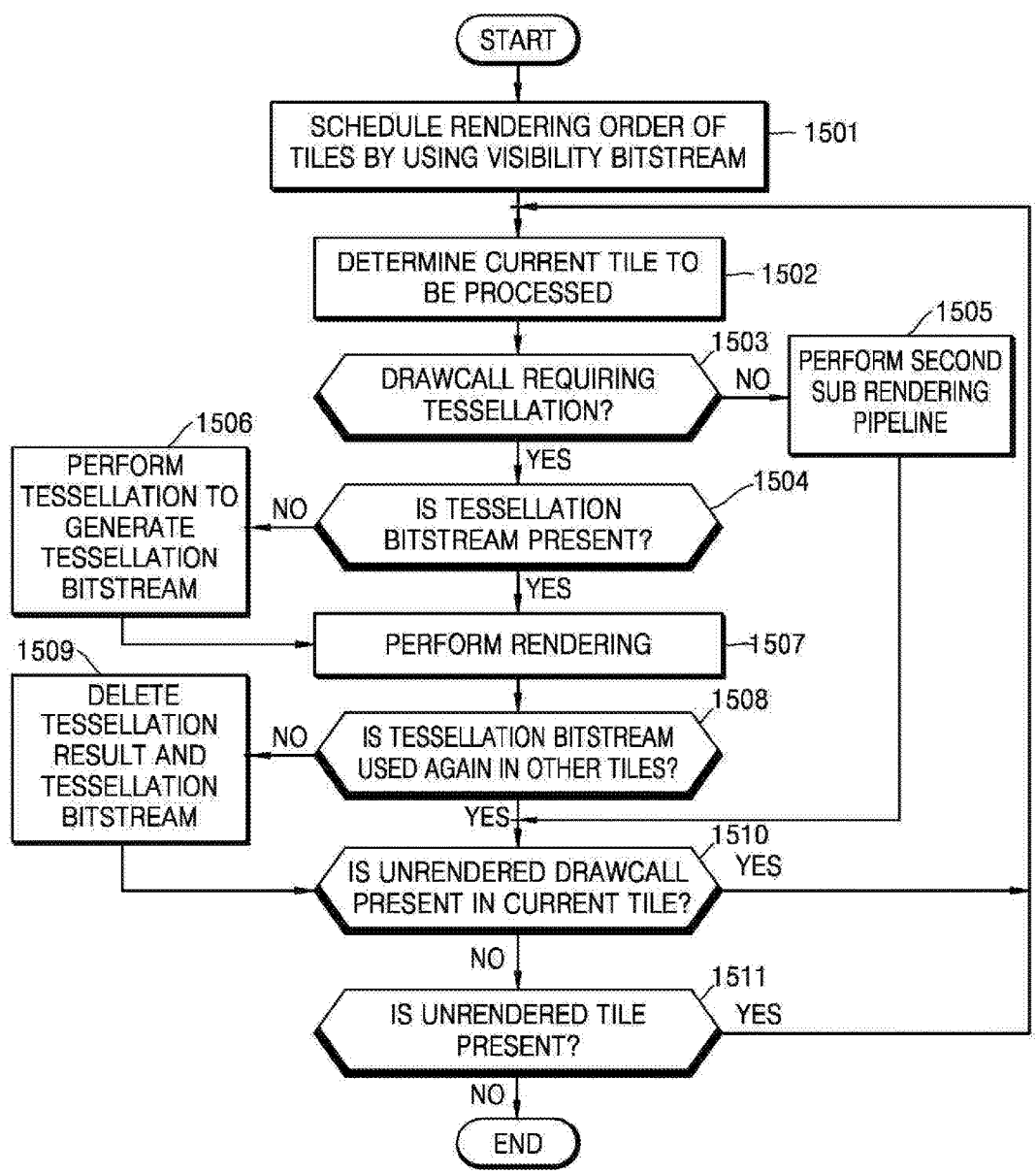
FIG. 15 is a diagram illustrating an example of a method of performing a rendering pipeline.

FIG. 15 is a diagram illustrating an example of a method of performing the rendering pipeline 102. The operations in FIG. 15 may be performed in the sequence and manner as shown, although the order of some operations may be changed or some of the operations omitted without departing from the spirit and scope of the illustrative examples described. Many of the operations shown in FIG. 15 may be performed in parallel or concurrently. In addition to the description of FIG. 15 below, the above descriptions of FIGS. 1-14, are also applicable to FIG. 15, and are incorporated herein by reference. Thus, the above description may not be repeated here.

In 1501, the GPU 10 may schedule a rendering order of tiles using a visibility bitstream. In this case, the GPU 10 may schedule the processing order of the tiles such that higher priorities are assigned to tiles covering a bounding box using a bounding box bitstream.

In 1502, the GPU 10 may determine a current tile to be processed (rendered) based on a result of the scheduling.

In 1503, the GPU 10 may determine whether a drawcall covered by the current tile is a drawcall requiring tessellation (that is, a first-type drawcall). When the drawcall covered by the current tile is the first-type drawcall, the GPU 10 proceeds to operation 1504. However, when the drawcall covered by the current tile is not the first-type drawcall but a drawcall requiring no tessellation (that is, a second-type drawcall), the GPU 10 proceeds to operation 1505.

In 1504, the GPU 10 may determine whether a tessellation bitstream is present in the memory 30 or the cache 185. When the tessellation bitstream is present, the GPU 10 proceeds to 1507. When the tessellation bitstream is not present (tessellation is needed), the GPU 10 proceeds to 1506.

In 1505, the GPU 10 may perform the second sub rendering pipeline 102-2 on the second-type drawcall requiring no tessellation.

In 1506, when the tessellation bitstream is not present (that is, tessellation is initially performed), the GPU 10 may generate a tessellation bitstream by performing a tessellation pipeline 300 on the first-type drawcall input to the GPU 10. Then, the generated tessellation bitstream and the generated coordinate data of the tessellated primitives may be stored in the memory 30 or the cache 185.

In 1507, the GPU 10 may perform the other rendering states using the generated tessellation bitstream and the generated coordinate data of the tessellated primitives stored in the process of rendering the previous tile, or the tessellation bitstream and the coordinate data of the tessellated primitives generated in 1506.

In 1508, the GPU 10 may determine whether the tessellation bitstream is used again in other tiles to be subsequently processed. That is, the GPU 10 may determine whether the first-type drawcall processed in the current tile is used in other tiles to be subsequently processed. When the first-type drawcall processed in the current tile is used in other subsequent tiles, the GPU 10 proceeds to operation 1510. When the first-type drawcall processed in the current tile is not used in other subsequent tiles, the GPU 10 proceeds to 1509.

In 1509, when the first-type drawcall processed in the current tile is not used in other subsequent tiles, the GPU 10 may control the operation of the deletion of such that data associated with the tessellated primitives from the memory 30 or the cache 185.

In 1510, the GPU 10 may determine whether an unrendered drawcall is present in the current tile. When the unrendered drawcall is present in the current tile, the GPU 10 returns to operation 1502. When the unrendered drawcall is not present in the current tile, the GPU 10 proceeds to 1511.

In 1511, the GPU 10 may determine whether an unrendered tile is present. When the unrendered tile is present, the GPU 10 returns to operation 1502. When the unrendered tile is not present, the performing of rendering pipeline is completed.

Figure 16:
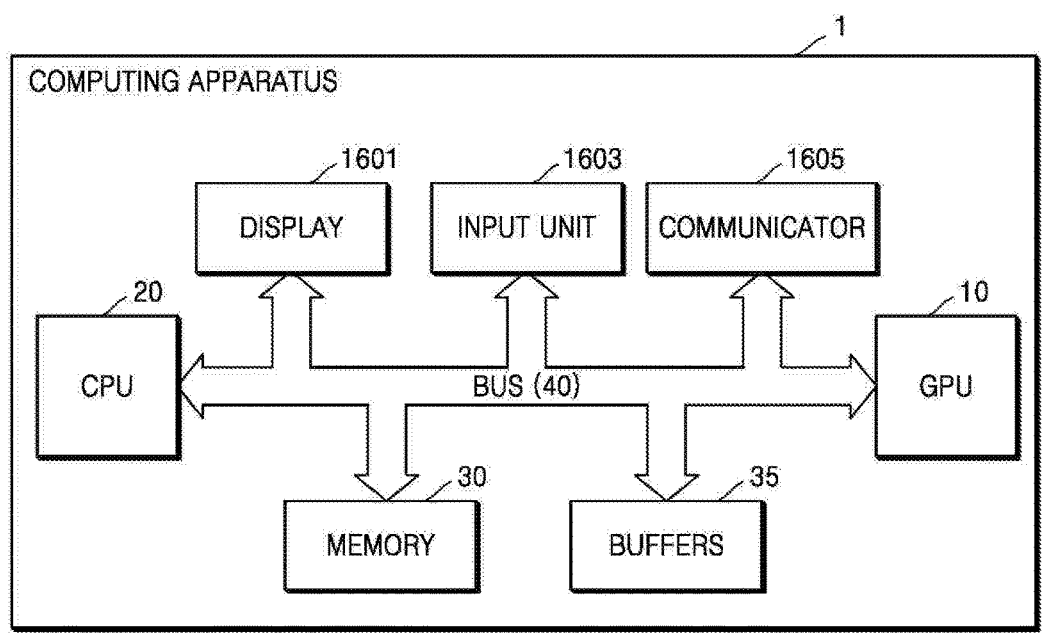
FIG. 16 is a diagram illustrating an example of a hardware configuration of a computing apparatus.

FIG. 16 is a diagram illustrating a hardware configuration of a computing apparatus 1, according to an embodiment.

Referring to FIG. 16, the computing apparatus 1 may includes a GPU 10, a CPU 20, a memory 30, buffers 35, a bus 40, a display 1601, an input unit 1603, and a communicator 1605. Only elements of the computing apparatus 1 related to the present embodiment are illustrated in FIG. 16. Therefore, it will be understood by those of ordinary skill in the art that the computing apparatus 1 may further include other general elements except for the elements illustrated in FIG. 16.

The GPU 10, the CPU 20, and the memory 30 may perform the operations and functions described above with reference to the accompanying drawings.

The buffers 35 may store tile information output through tile-based graphics pipeline or tile-based rendering. For example, the buffers 35 may store a result of a depth test in tiles or a result of rendering in tiles. Although the buffers 35 are illustrated in FIG. 16 as being provided separately from the GPU 10, the CPU 20, or the memory 30 in the computing apparatus 1, the buffers 35 may be provided inside the GPU 10, the CPU 20, or the memory 30.

The display 1601 may be a display interface for displaying a variety of information, such as information processed by the computing apparatus 1 or information to be processed by the computing apparatus 1, to a user. In an example, the display 1601 may display a graphical user interface (GUI) for visually and intuitionally providing information processed by the computing apparatus 1 to the user. For example, the display 1601 may display graphics data processed by the GPU 10. The display 1601 may be a physical structure that includes one or more hardware components that provide the ability to render a user interface and/or receive user input, such as, for example, a liquid crystal display (LCD) panel, a light-emitting diode (LED) panel, and a plasma display panel (PDP). The display can encompass any combination of display region, gesture capture region, a touch sensitive display, and/or a configurable area. The display can be embedded in the signal feature extracting apparatus or may be an external peripheral device that may be attached and detached from the signal feature extracting apparatus. The display may be a single-screen or a multi-screen display. A single physical screen can include multiple displays that are managed as separate logical displays permitting different content to be displayed on separate displays although part of the same physical screen. The display may also be implemented as an eye glass display (EGD), which includes one-eyed glass or two-eyed glasses.

The input unit 1603 may be an input interface for allowing a user to input information. In an example, the input unit 1603 may be implemented in the form of a touch pad, a trackball, a mouse, a keyboard, or a game controller. In an example, the display 1601 and the input unit 1603 may be implemented by an integrated touch screen.

The communicator 1605 may include a mobile communication module for mobile communication, a wired/wireless local area network (LAN) module, a Wi-Fi module for short-range wireless communication, a Bluetooth module, a near field communication (NFC) module, and the like.

Figure 17:
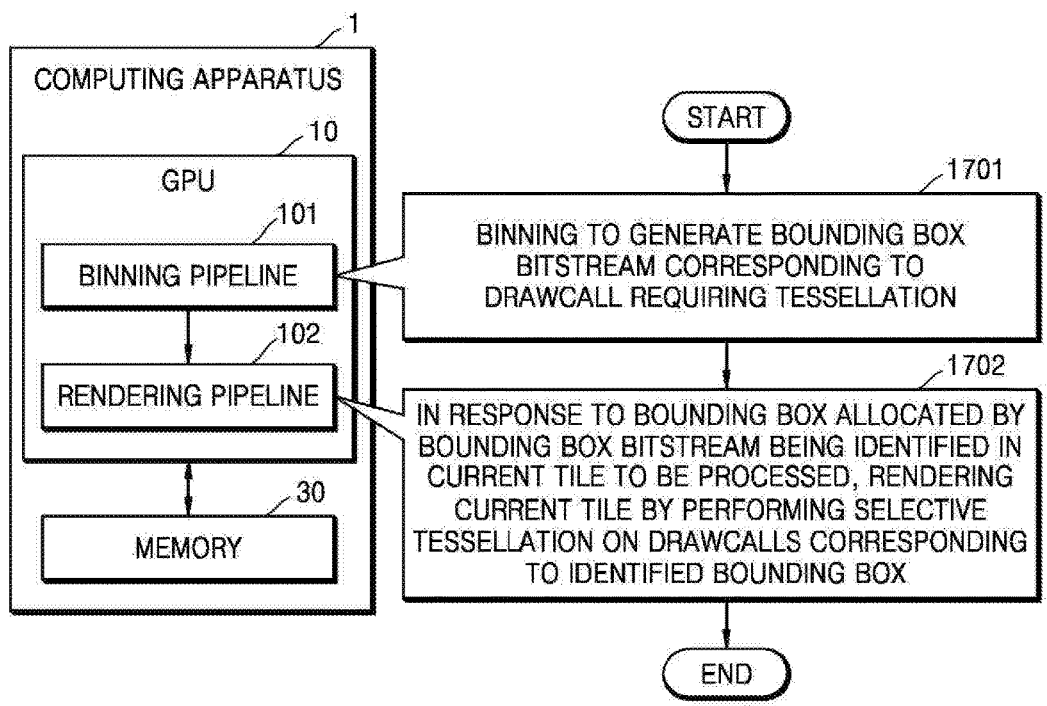
FIG. 17 is a diagram illustrating an example of a method of performing a graphics pipeline.

FIG. 17 is a diagram illustrating an example of a method of performing a graphics pipeline 100. The operations in FIG. 17 may be performed in the sequence and manner as shown, although the order of some operations may be changed or some of the operations omitted without departing from the spirit and scope of the illustrative examples described. Many of the operations shown in FIG. 17 may be performed in parallel or concurrently. In addition to the description of FIG. 17 below, the above descriptions of FIGS. 1-16, are also applicable to FIG. 17, and are incorporated herein by reference. Thus, the above description may not be repeated here.

In 1701, the GPU 10 may perform a binning pipeline 101 to generate a bounding box bitstream including a result of tile binning of a bounding box corresponding to a drawcall requiring tessellation.

In 1702, when a bounding box allocated by the bounding box bitstream is identified in a current tile to be processed, the GPU 10 may perform the rendering pipeline 102 to render the current tile by performing selective tessellation on drawcalls corresponding to the identified bounding box.

The apparatuses, units, modules, devices, and other components illustrated in FIGS. 1, 3, 6, 7, 8, 14, 16, and 17, for example, that may perform operations described herein with respect to FIGS. 1, 7, 8, 9, 14, 15, and 17, for example, are implemented by hardware components. Examples of hardware components include controllers, sensors, memory, drivers, comparators, arithmetic logic units, adders, subtractors, multipliers, dividers, integrators, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer, e.g., by implementing computer execute code, instructions, or software, such as an operating system (OS) and one or more software applications that run on the OS, may perform the operations described herein with respect to FIGS. 1, 7, 8, 9, 14, 15, and 17, as only an example. The hardware components also access, manipulate, process, create, and store data in response to execution of the instructions or software. For simplicity, the singular term "computing apparatus", "processor", or "computer" may be used in the description of the examples described herein, but in other examples multiple computing apparatuses (computing devices), processors, or computers are used, or a computing apparatus, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. In addition, connecting lines or connectors shown in the various apparatus figures are intended to represent example functional relationships and/or physical or logical couplings between the various hardware elements, with many alternative or additional functional relationships, physical connections, or logical connections may be present in a corresponding device embodiment.

The methods illustrated in FIGS. 1, 7, 8, 9, 14, 15, and 17 that perform the operations described herein may be performed by a computing hardware, processor, or a computer as described above executing computer readable code, instructions, or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Based on the disclosure herein, programmers of ordinary skill in the art can readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a computing apparatus (or a computing device), a processing device, processor, or computer to implement the hardware components, such as discussed in any of FIGS. 1, 3, 6, 7, 8, 14, 16, and 17, and perform the methods as described above in any of FIGS. 1, 7, 8, 9, 14, 15, and 17, and any associated data, data files, and data structures, are recorded, stored, or fixed in or on one or more non-transitory processor/computer-readable storage media. Examples of a non-transitory processor/computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the processor or computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, an electronic device embodiment herein, such as the above described electronic device with regard to FIGS. 1, 3, 6, 7, 8, 14, 16, and 17, and/or configured to implement the methods described with regard to FIGS. 1, 7, 8, 9, 14, 15, and 17, may include a mobile device, such, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The mobile device may be implemented in a smart appliance, an intelligent vehicle, or in a smart home system.

The mobile device may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard. Depending on embodiment, the mobile device includes a display.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A method of performing a graphics pipeline in a graphic processing apparatus, the method comprising:
   determining, by a binning pipeline, whether each of a plurality of input drawcalls is a first-type drawcall requiring tessellation or a second-type drawcall requiring no tessellation;
   performing, by the binning pipeline, tile binning to identify a tile list covering a bounding box corresponding to the first-type drawcall;
   generating, by the binning pipeline, a bounding box bitstream, the bounding box bitstream comprising identification information indicating the first-type drawcall, identification information indicating the second-type drawcall, and information about the tile list; and
   performing, by a rendering pipeline, a tessellation, wherein the tessellation is only performed on tiles including the first-type drawcall,
   wherein when a first tile includes the first-type drawcall, primitives of the first tile are tessellated, and when a second tile includes the first-type drawcall and the same primitives as the first tile, the second tile is not tessellated.

2. The method of claim 1, further comprising generating, by the binning pipeline, a drawcall bitstream comprising, for each of the tiles, information indicating whether at least one of the input drawcalls is present in the tile, and a primitive bitstream comprising, for each of the tiles, information indicating a number of primitives included in the input drawcalls.

3. The method of claim 1, wherein the tessellation is deferred from being performed in the binning pipeline.

4. The method of claim 1, wherein the first-type drawcall is processed by a first sub rendering pipeline including a tessellation stage, and the second-type drawcall is processed by a second sub rendering pipeline not including the tessellation stage.

5. The method of claim 1, further comprising:
scheduling, by the rendering pipeline, a rendering order of the tiles based on the bounding box bitstream, such that a higher priority is assigned to a tile covering the bounding box; and
performing, by the rendering pipeline, rendering on a per-tile basis according to the scheduled rendering order.

6. The method of claim 1, further comprising deleting data associated with tessellated primitives from a memory, when tessellated primitives for the first-type drawcall are not used in other tiles.

7. A non-transitory computer-readable recording medium comprising computer readable code to implement the method of claim 1.

8. A computing apparatus for performing a graphics pipeline, the computing apparatus comprising:
a graphic processing unit (GPU) configured to:
determine, by a binning pipeline, whether each of a plurality of input drawcalls is a first-type drawcall requiring tessellation or a second-type drawcall requiring no tessellation;
perform, by the binning pipeline, tile binning to identify a tile list covering a bounding box corresponding to the first-type drawcall;
generate, by the binning pipeline, a bounding box bitstream, the bounding box bitstream comprising identification information indicating the first-type drawcall, identification information indicating the second-type drawcall, and information about the tile list; and
perform, by a rendering pipeline, a tessellation, wherein the tessellation is only performed on each tile including the first-type drawcall,
wherein when a first tile includes the first-type drawcall, primitives of the first tile are tessellated, and when a second tile includes the first-type drawcall and the same primitives as the first tile, the second tile is not tessellated; and
a memory configured to store the bounding box bitstream generated in the binning pipeline and to provide the stored bounding box bitstream to the rendering pipeline.

9. The computing apparatus of claim 8, wherein; the GPU is further configured to generate a drawcall bitstream comprising, for each of the tiles, information indicating whether at least one of the input drawcalls is present in the tile, and a primitive bitstream comprising, for each of the tiles, information indicating a number of primitives included in the input drawcalls.

10. The apparatus of claim 8, wherein the GPU is further configured to defer the tessellation from being performed in the binning pipeline.

11. The apparatus of claim 8, wherein the first-type drawcall is processed by a first sub rendering pipeline including a tessellation stage, and the second-type drawcall is processed by a second sub rendering pipeline not including the tessellation stage.

12. The apparatus of claim 8, wherein the GPU is further configured to:
schedule a rendering order of the tiles based on the bounding box bitstream, such that a higher priority is assigned to a tile covering the bounding box, and
perform rendering on a per-tile basis according to the scheduled rendering order.

13. The apparatus of claim 8, wherein the memory is further configured to delete data associated with tessellated primitives while the tessellated primitives for the first-type drawcall are not used in other tiles.

* * * * *